July 4, 1950  J. E. ECKLUND  2,513,554
BODY DUMPING VEHICLE
Filed Oct. 3, 1947  2 Sheets-Sheet 1

JOSEPH E. ECKLUND
Inventor

By Williamson & Williamson
Attorneys

July 4, 1950 J. E. ECKLUND 2,513,554
BODY DUMPING VEHICLE
Filed Oct. 3, 1947 2 Sheets-Sheet 2
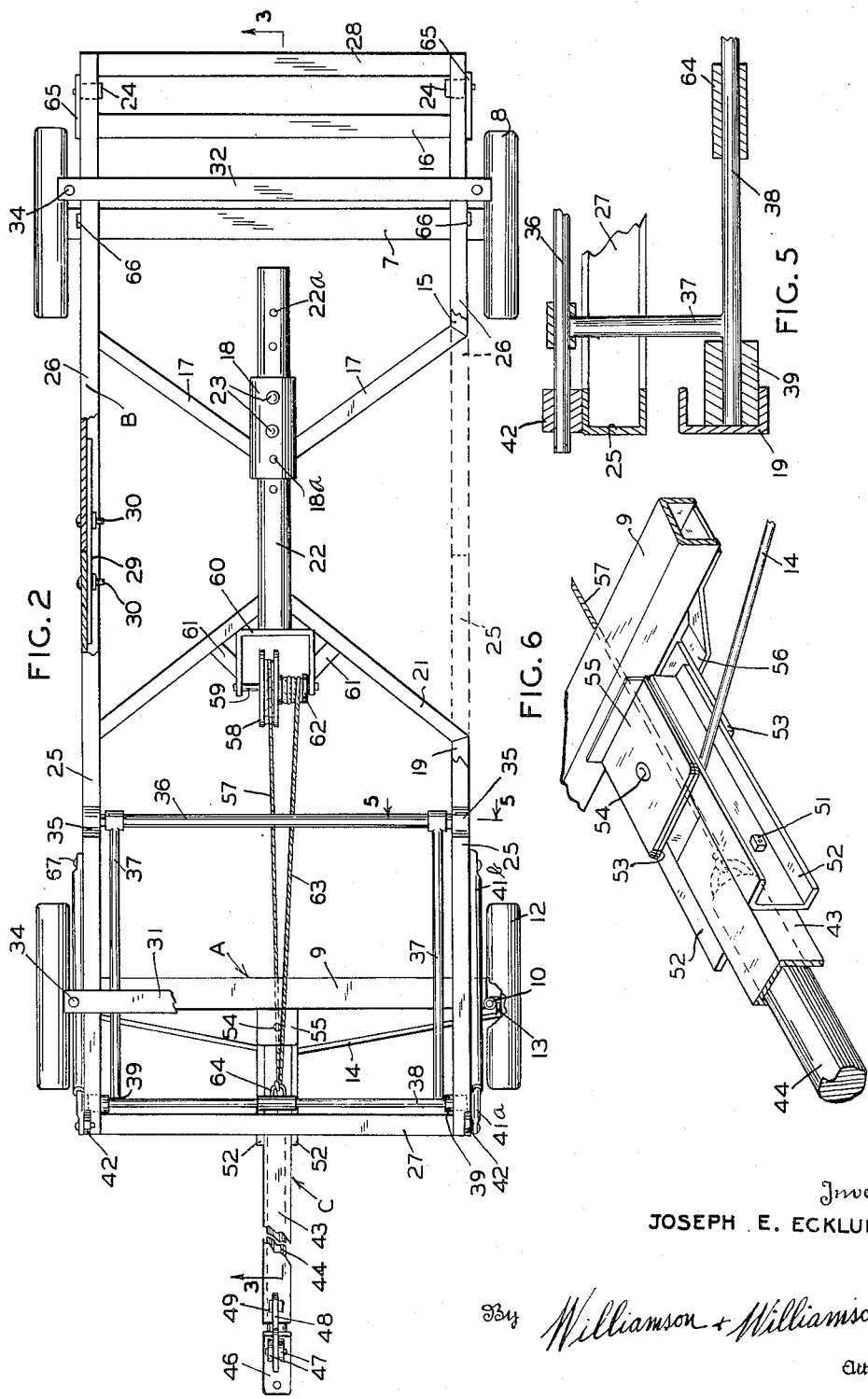
Inventor
JOSEPH E. ECKLUND
By Williamson + Williamson
Attorneys Patented July 4, 1950

2,513,554

UNITED STATES PATENT OFFICE 2,513,554

BODY DUMPING VEHICLE

Joseph E. Ecklund, Minneapolis, Minn., assignor of one-fourth to Paul Ebling, Minneapolis, and one-fourth to Ernest Pollard, Welcome, Minn.

Application October 3, 1947, Serial No. 777,789

18 Claims. (Cl. 298—12)

This invention relates to body dumping vehicles particularly adaptable for farm use but also capable of use in transporting and dumping goods of any nature.

It is one of the objects of the invention to provide a novel and improved body dumping vehicle including a wheeled frame and platform on which a wagon box can be carried, the platform being mounted in such relation on the wheeled vehicle that it can be readily tilted while being slid rearwardly to lighten the load at the forward end of the platform and thereafter further tilted to a considerable height to permit ready dumping of the contents of the wagon box carried by the platform.

A further object is to provide a body dumping vehicle including a wheeled frame having a drawbar a platform mounted on the frame and means for tilting the platform by a pull exerted on the drawbar of the wheeled frame.

Another object is to provide a novel and improved body dumping vehicle including a wheeled frame, a platform mounted thereon, and simple and efficient means for effectively raising one end of the platform from a position resting directly on the wheeled frame and thereafter materially increasing the angle of tilt of the platform to permit easy dumping of the contents as of a wagon box or the like supported on the platform.

The objects and advantages of the invention will more fully appear from the following description made in connection with the accompanying drawings wherein like reference characters refer to the same or similar parts throughout the various views and in which:

Fig. 2 is a plan view of the device, certain parts being broken away to more clearly illustrate the construction of other parts;

Fig. 5 is a vertical section taken on the line 5—5 of Fig. 2 as indicated by the arrows; and Fig. 6 is a detail view in perspective illustrating portions of the drawbar and connecting parts.

Figure 4:
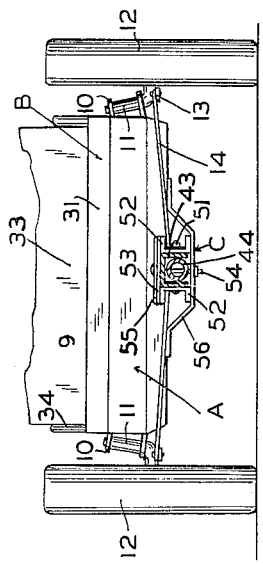
Fig. 4 is a vertical section taken substantially on the line 4—4 of Fig. 1, a portion of the wagon box being shown.

Referring to the drawings, certain of the main assemblies of the device are designated by letter, the wheeled frame being designated as an entirety by the letter A, the platform by the letter B, and the drawbar by the letter C.

The wheeled frame A includes a rear axle 7 equipped with wheels 8. There is also provided a front axle 9 having at its ends brackets 10 within which wheel spindles 11 are mounted, these spindles being equipped with front wheels 12 and the spindles being provided with forwardly projecting steering arms 13 to which tie rods 14 are connected. The frame of the wheeled vehicle includes rear longitudinal side channels 15 connected adjacent but spaced slightly forwardly from their rear ends by a rear crossbar 16, also preferably of channel shape. The two side channels 15 are secured to the rear axle 7 and a pair of diagonal bars 17 run inwardly and forwardly from the forward ends of the two side channels 15 and are secured to a central tubular socket 18 having a number of bolt-receiving openings 18a formed therein. Mounted on the front axle 9 are a pair of longitudinally extending side channels 19 interconnected at their forward ends by a forward crossbar 20, preferably also of channel construction. Rearwardly and inwardly extending bars 21 connect with the rear ends of the side channels 19, and they in turn connect with a central tube 22 received within the tubular socket 18 and having at spaced intervals longitudinally thereof a number of aligned bolt-receiving openings 22a. With this arrangement the length of the wheeled vehicle can be varied readily to suit it to wagon boxes of varying lengths by extending the tube 22 forwardly from the socket 18 varying lengths, nutted bolts 23 being employed running through the proper bolt openings 18a and 22a to hold the tube 22 in place relative to the socket 18 and after the length of the wheeled vehicle A has been properly adjusted.

Journaled in the extreme rear end portions of the rear longitudinal channels 15 so that the upper surfaces thereof lie approximately flush with the top surfaces of the rear crossbar 16 are a pair of rollers 24. The platform B, when in normal lowered condition, rests directly on the upper flanges of the front and rear longitudinal channels 19 and 15 and on the upper surfaces of the rollers 24. This platform B includes forward and rear side bars 25 and 26 respectively, a front crossbar 27 interconnecting the forward ends of the front side bars 25, and a rear crossbar 28 interconnecting the rear ends of the two rear side bars 26, all of these bars being preferably of channel construction. At the two sides of the platform the forward side bars 25 are connected to the rear side bars 26 by straps 29 having a multiplicity of spaced bolt openings therein receiving nutted bolts 30 running through suitable bolt openings in the various front and rear side bars 25 and 26. With this arrangement, the length of the platform B can be varied to take wagon boxes of different length and to accommodate the platform to the adjustable length of the wheeled frame A. The platform B includes front and rear cross bolsters 31 and 32 respectively on which a wagon box 33 may rest, the said bolsters being equipped with upwardly extending pins 34 or the like to be received within pin openings in the bottom of the wagon box. While the details of the wagon box 33 are of no consequence to the present invention, the wagon box 33 should be equipped with a rear tail gate 33a which can be swung open or removed for the purpose of dumping the contents of the wagon box.

Mounted at the upper sides of the longitudinal side bars 25 of the platform in spaced relation rearwardly from the forward ends of these bars are a pair of bearings 35 within which a cross shaft 36 is journaled. A pair of arms 37 are secured at their normally rear ends to the cross shaft 36, and these arms normally project forwardly and the forward ends of the arms are connected to a crossbar 38, the outer ends of which are received within the front longitudinal channels 19 and carry thereon rollers 39 which bear against and ride on the lower flanges of the front longitudinal channels 19. Projecting downwardly from the front longitudinal channels 19 in spaced relation rearwardly from the forward ends of these channels are a pair of brackets 40 to which the lower ends of extensible links 41 are pivoted. The links 41 project diagonally upwardly and forwardly from the brackets 40 in their normal position and the upper ends of these extensible links are pivotally connected to ears 42 mounted at the upper sides of the extreme forward ends of the side bars 25 of the platform B. The extensible links 41, as shown, each include a rod 41a telescopically received within a tube 41b, the tube 41b being pivotally connected to one of the brackets 40 and the rod 41a being pivotally connected to one of the ears 42.

The drawbar C includes a channel-shaped tongue 43 within which a rod 44 is received, the tongue 43 including a lower cross strap 45 for retaining the rod 44 in place. The rod 44 at its forward end includes a clevis 46 whereby the rod 44 may be connected as to a tractor or the like for drawing the wheeled frame A behind it. Pivotally mounted on upstanding ears 47 on the clevis 46 is a latch 48, the tooth of which may be engaged with a cleat 49 carried by the forward portion of the tongue 43 whereby the rod 44 may be prevented from being pulled forwardly relative to the tongue 43. A cord or cable 50 will be attached to the latch 48, and this cord or cable 50 may be extended forwardly to a position near the driver's seat of the tractor or other draft vehicle whereby the latch can be disengaged from the cleat 49 by the driver of the vehicle.

The rear portion of the tongue 43 is secured by pivots 51 to a pair of side bars 52, and of course the tongue 43 is free to swing upwardly and downwardly on the pivots 51. The side bars 52 carry adjacent their rear portions top and bottom plates 53 which are connected by pivots 54 to upper and lower brackets 55 and 56 respectively attached to the front axle 9 of the wheeled frame A. The inner ends of the tie rods 14 are connected to the side bars 52. With this arrangement it will be seen that, as the forward end of the drawbar C is swung to the right or to the left, motion imparted to the drawbar will be transmitted through the tie rods 14 to the arms 13 whereby the front spindles 11 will be turned to steer the front wheels 12 of the wheeled frame.

A cable 57 has its forward end secured to the rear end of the rod 44 received within the tongue 43 of the drawbar C. From the rear end of the rod 44 the cable 57 runs rearwardly onto a winding drum 58 journaled on a short cross shaft 59 mounted in a U-shaped bracket 60 secured to the forward end of the tube 22 of the wheeled frame, the bracket 60 being also suitably braced and supported from the diagonal bars 21 by struts 61. Attached to or otherwise fixed for rotation with the winding drum 58 is a smaller winding drum 62 also journaled on the shaft 59. A cable 63 has its rear end attached to and partially wound on the small winding drum 62, and this cable 63 runs forwardly and has its forward end attached to a bail 64 carried by the crossbar 38 to which the arms 37 are connected. With this arrangement, as the rod 44 is extended forwardly relative to the tongue 43, the cable 57 will be wound off the larger winding drum 58 while additional portions of the cable 63 will be wound on to the smaller winding drum 62 inasmuch as the cable 57 pays off one side of the winding drum 58 and the cable 63 pays off the other side of the winding drum 62. Due to the difference in size of the two winding drums, the cable 63 will be wound onto the small drum 62 more slowly than the cable 57 will be wound off the drum 58, but of course more force will be exerted by the cable 63 than is required to pull the cable 57. As the cable 63 winds onto the drum 62, the bar 38 will be drawn rearwardly by the cable 63.

Mounted on the rear longitudinal channels 15 of the wheeled frame A are a pair of stops 65, which cooperate with stop pins 66 on the platform to limit rearward sliding movement of the platform B relative to the wheeled frame A.

Figure 1:
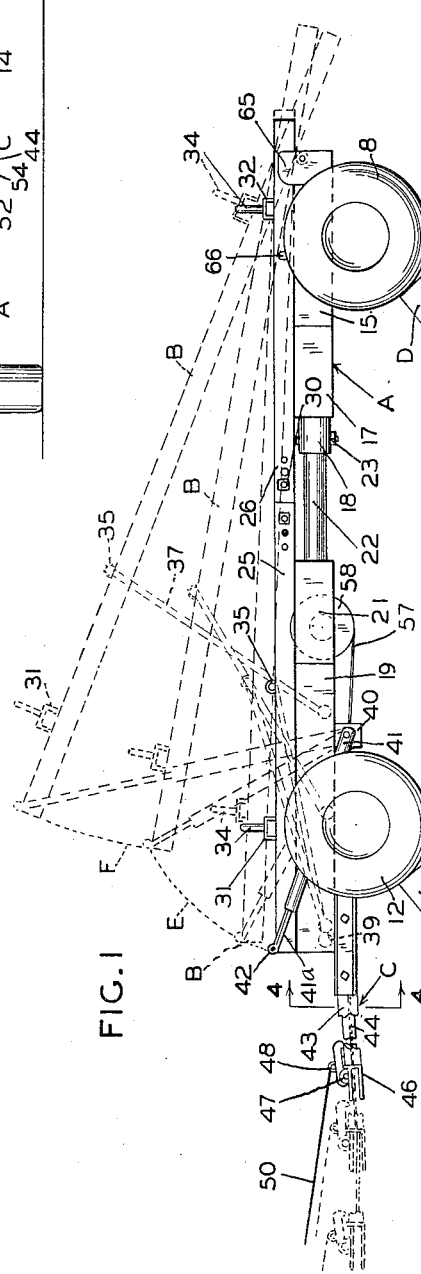
Fig. 1 is a view in side elevation illustrating a body dumping vehicle of the invention, the platform of the device and the other movable parts being shown in a lowered position in full lines and being shown in dotted lines as these parts will appear during three successive stages of the tilting action.
Figure 3:
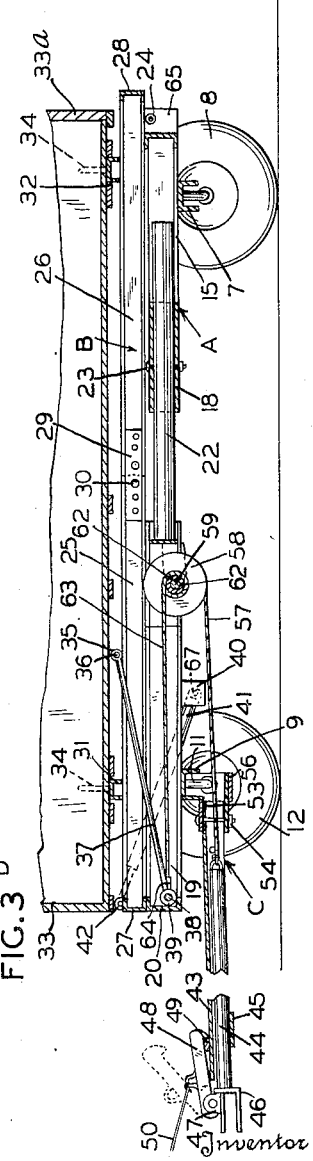
Fig. 3 is a longitudinal vertical section taken on the line 3—3 of Fig. 2 as indicated by the arrows, portions of the wagon box mounted on the platform being illustrated.

Let us assume that a tractor is connected to the clevis 46 of the drawbar C and that a wagon box 33 is mounted on the platform B of the device. The wagon box may be loaded, whereupon the tractor may be employed to carry the wheeled frame A, platform B, and wagon box 33 to the point where it is desired to dump the wagon box, the parts at this time being in the position shown in full lines, Fig. 1, and as shown in Fig. 3. When it is desired to dump the wagon box, preferably both the front and rear wheels of the wheeled frame A will be blocked up as by blocks D, whereupon the driver of the tractor will trip the latch 48 by pulling on the cord 50, causing the latch 48 to disengage from the cleat 49. The tractor will then be driven slowly forwardly, pulling with it the rod 44 and causing the cable 57 to unwind from the winding drum 58. Simultaneously the drum 62 will cause additional portions of cable 63 to be wound on this drum, thereby drawing the crossbar 38 to which the arms 37 are attached rearwardly. As this occurs, the forward portion of the wagon box will be caused to swing throughout an arc described about the pivotal axis of the pivots 67 connecting the lower ends of the extensible links 41 to the brackets 40, the links 41 not extending during this first movement. The rollers 39 mounted on the crossbar 38 to which the arms 37 are connected will roll rearwardly over the lower flanges of the forward longitudinal channels 19 as this occurs and the platform B and wagon box 33 carried thereby will be raised at their forward ends while being slid rearwardly on the rollers 24. The arc described by the forward end portion of the platform during this first lifting and sliding action is indicated in dotted lines, Fig. 1, and designated by the letter E. At length the stop pins 66 on the platform B will be brought into engagement with the stops 65 mounted on the rear longitudinal channels 15 of the wheeled frame to limit further rearward sliding movement of the platform and wagon box. Part of the load of course of the platform and wagon box 33, while the forward ends of the same are being raised through the arc E, is shifted rearwardly beyond the rollers 24 of the wheeled frame so as to lighten the load forward of these rollers. As the stop pins 66 engage the stops 65, the platform B, after having first reached the lower dotted line position shown in Fig. 1, will arrive at the intermediate dotted line position shown in Fig. 1. Now as additional portions of the cable 63 wind onto the small winding drum 62, it is no longer possible for the platform to slide rearwardly relative to the wheeled frame, but the forward end of the wheeled frame and the forward end of the wagon box carried thereby will continue to be raised by reason of the continued upward extension of the arms 37. As this occurs, the rods 41a of the extensible links will telescope outwardly from the tubes 41b of these links, permitting further tilting movement of the platform B and the wagon box carried thereby. In other words, the forward end of the platform will be moved through the arc F shown in Fig. 1 to carry the platform to the highest dotted line position there shown. Of course prior to the dumping action, the rear end 33a of the wagon box will be removed or swung open, and as the platform and wagon box tilt upwardly to the highest position indicated, the contents of the wagon box will be dumped from the rear end thereof. Of course the tractor will be stopped when the platform has been raised to the highest position shown in Fig. 1.

The load from the wagon box having been dumped, the tractor will be slowly backed up toward the wheeled frame and the weight of the platform B, together with the wagon box 33 mounted thereon, will carry the said parts downwardly from the highest position shown in dotted lines successively through the different positions shown in dotted lines to the full line position there shown until the platform B again rests on the wheeled frame A. As this occurs, the cable 63 will be drawn off the small drum 62, and the cable 57 will be rewound onto the large drum 58 until the parts are all back to their original position, the latch 48 again engaging with the cleat 49. The blocks D can then be removed, whereupon the vehicle can be drawn to the point desired for reloading.

Due to the fact that during the initial part of the lifting operation the platform B is confined by the extensible links 41 to move through the arc E, the load is quite readily lifted through the action of the arms 37, the lower ends of which slide rearwardly relative to the wheeled frame. In other words, the extensible links 41 guide the movement of the load during the first part of the lifting action; thereupon after the platform has been moved through the arc E, the lower ends of the arms 37 are more in line with the shaft 36 about the axis of which these arms pivot, and during the last part of the tilting movement of the platform through the arc F, the platform, while being guided by the extensible links 41, is properly supported by the arms 37 and the structure rigidly connected thereto.

It will be seen that a highly effective but simple body dumping vehicle has been provided. The device can be very readily elongated or shortened to take bodies of various lengths and a single device may therefore be used with different types of wagon box bodies.

It will of course be understood that various changes may be made in the form, details, arrangement, and proportion of the various parts without departure from the scope of the present invention, which generally stated consists in the matter shown and described and set forth in the appended claims.

I claim:

1. A body dumping vehicle comprising a wheeled frame having a forward end and a rear end, a wagon box receiving platform mounted on said frame for tilting movement thereof relative to the rear portion of the frame and for limited sliding movement thereof relative to the frame, an arm pivotally connected at its upper end to said platform in spaced relation from the forward end thereof and normally projecting forwardly of its pivot point and having its lower end supported on said frame for sliding movement relative thereto, means for drawing the lower end of said arm rearwardly on said frame, means for guiding the forward end of said platform for swinging movement through an arc taken about an axis extending transversely of the wheeled frame and located forwardly of the rear end of the wheeled frame during the first part of the action of said first-mentioned means and for guiding the forward end of said platform through an arc taken about an axis running transversely of the wheeled frame at the rear end of the same during the latter part of the action of said first-mentioned means.

2. A body dumping vehicle comprising a wheeled frame having a forward end and a rear end, a wagon box receiving platform mounted on said frame for tilting movement thereof relative to the rear portion of the frame and for limited sliding movement thereof relative to the frame, an arm pivotally connected at its upper end to said platform in spaced relation from the forward end thereof and normally projecting forwardly of its pivot point and having its lower end supported on said frame for sliding movement relative thereto, a longitudinally extensible link pivotally connected at its upper end to the forward portion of said platform and pivotally connected at its lower portion to said frame rearwardly of the normal position of the lower end of said arm, and means for drawing the lower end of said arm rearwardly on said frame, thereby first causing the forward end of said platform to tilt upwardly while the platform is being slid rearwardly as guided by said link and thereafter causing further upward tilting movement of the forward portion of said platform through extension of said extensible link.

3. The structure defined in claim 2 and means limiting the rearward sliding movement of said platform relative to said frame.

4. A body dumping vehicle comprising a wheeled frame having a forward end and a rear end, a wagon box receiving platform mounted on said frame for tilting movement thereof relative to the rear portion of the frame and for limiting sliding movement thereof relative to the frame, an arm pivotally connected at its upper end to said platform in spaced relation from the forward end thereof and normally projecting forwardly of its pivot point, rollers carried by said arm and having bearing against said wheeled frame for sliding movement thereon, a longitudinally extensible link pivotally connected at its upper end to the forward portion of said platform and pivotally connected at its lower portion to said frame rearwardly of the normal position of said rollers, means for drawing the lower end of said arm rearwardly on said frame, and means limiting rearward sliding movement of said platform relative to said frame whereby, as the lower end of said arm is initially moved rearwardly, the forward end of said platform guided by the link in non-extended condition will be tilted upwardly while the platform is being slid rearwardly until rearward sliding movement of the frame is prevented by said limiting means and thereafter said extensible link will extend to permit further upward tilting movement of the forward portion of said platform.

5. A body dumping vehicle comprising a wheeled frame having a forward end and a rear end, said frame having roller receiving guideways in its forward portion, a wagon box receiving platform mounted on said frame for tilting movement thereof relative to the rear portion of the frame and for limiting sliding movement thereof relative to the frame, an arm pivotally connected at its upper end to said platform in spaced relation from the forward end thereof and normally projecting forwardly of its pivot point, rollers carried by the forward end of said arm and working within said guideways, a longitudinally extensible link pivotally connected at its upper end to the forward portion of said platform and pivotally connected at its lower portion to said frame rearwardly of the normal position of said rollers, means limiting rearward sliding action of said platform relative to said frame, and means for drawing the lower end of said arm rearwardly on said frame.

6. The structure defined in claim 5, said last mentioned means including a two-part drawbar, the first part of which is connected to said wheeled frame and the second part of which may be drawn forwardly from said first part, releasable latching means preventing withdrawal of the second part from the first part, and connecting means between said second part and the lower end of said arm adapted to draw the lower end of said arm rearwardly as said second part of the drawbar is drawn forwardly.

7. A body dumping vehicle comprising a wheeled frame having a forward end and a rear end, a wagon box receiving platform mounted on said frame for tilting movement thereof relative to the rear portion of the frame and for limited sliding movement thereof relative to the frame, rollers mounted on the rear portion of said frame and on which said platform may ride as the forward end of the platform is tilted upwardly, means limiting rearward sliding movement of said platform relative to the frame, an arm pivotally connected at its upper end to said platform in spaced relation from the forward end thereof and normally projecting forwardly of its pivot point and having its lower end supported on said frame for sliding movement relative thereto, a longitudinally extensible link pivotally connected at its upper end to the forward portion of said platform and pivotally connected at its lower portion to said frame rearwardly of the normal position of the lower end of said arm, and means for drawing the lower end of said arm rearwardly on said frame.

8. The structure defined in claim 7, rollers carried by the forward end of said arm, said frame having guide tracks receiving said rollers.

9. A body dumping vehicle comprising a wheeled frame having a forward end and a rear end, a wagon box receiving platform mounted on said frame for tilting movement thereof relative to the rear portion of the frame and for limited sliding movement thereof relative to the frame, means limiting the rearward sliding movement of said platform relative to the frame, a pair of arms pivotally mounted at their upper ends on said platform in spaced relation from the forward end thereof and normally projecting forwardly of their pivots, rollers carried by the lower ends of said arms, said frame having longitudinally extending guide tracks receiving said rollers, longitudinally extensible links pivotally connected at their upper ends to forward portions of said platform and pivotally connected at their lower ends to said frame rearwardly of the normal position of said rollers, and means for drawing the lower ends of said arms rearwardly relative to said frame.

10. A body dumping vehicle comprising a wheeled frame having a forward end and a rear end, a wagon box receiving platform received on said frame for limited rearward sliding movement and for tilting movement relative thereto, means limiting the rearward sliding movement of said platform relative to said frame, an arm pivotally connected to said frame rearwardly from the forward end thereof and having its forward end normally projecting forward from said pivot point and mounted for sliding movement on the frame, an extensible link having its upper end pivotally connected to said platform forwardly of the pivot point of said arm and having its lower end pivotally connected to said frame rearwardly of the normal forward position of the lower end of said arm, a tongue for said wheeled frame projecting forwardly therefrom, a member slidably mounted in said tongue, means for releasably connecting said member to said tongue to prevent forward extension of said member relative to the tongue and cable means connected to said member and running rearwardly therefrom, said cable means including a portion running forwardly from a point rearwardly of the pivot point of said arm and connected to the lower end of said arm.

11. The structure defined in claim 10, said cable means including two cables and two winding drums, the two winding drums being mounted for rotation together, a transverse shaft carried by said frame rearwardly of the pivot point of said arm and on which said winding drums are mounted, one of the cables being connected to said member and being partially wound on one of the drums, the other cable being connected to the lower end of said arm and being wound on the other of said drums, the two drums being of different diameters and the two cables paying off their respective drums at diametrically opposite sides thereof.

12. A body dumping vehicle comprising a wheeled frame having a forward end and a rear end, a wagon box receiving platform received on said frame for limited rearward sliding movement and for tilting movement relative thereto, an arm pivotally connected to said frame rearwardly from the forward end thereof and having its forward end normally projecting forward from said pivot point and mounted for sliding movement on said frame, an extensible link having its upper end pivotally connected to said platform forwardly of the pivot point of said arm and having its lower end pivotally connected to said frame rearwardly of the normal forward position of the lower end of said arm, a tongue for said wheeled frame projecting forwardly therefrom, a rod slidably mounted in said tongue, means for releasably connecting said rod to said torque to prevent forward extension of the rod therefrom, a cable connected to the rear end of said rod, a winding drum journaled on said wheeled frame and on which a portion of said cable is wound, a second winding drum mounted for revolution as said first-mentioned winding drum is turned, a cable normally partially wound on said second winding drum and projecting forwardly to the lower end of said arm and connected thereto, said cables paying off of opposite sides of said respective winding drums, whereby when said releasable connecting means is disengaged and force is applied to draw said rod in a forward direction from said drawbar, the first-mentioned cable will be wound off said first-mentioned drum and additional portions of said second-mentioned cable will be wound up on said second-mentioned drum thereby moving the lower portion of said arm rearwardly to tilt said platform and slide the same somewhat rearwardly on the wheeled frame while the platform is being guided by said link, whereupon after said extensible link has been swung to a certain point without extension of the same, extension of said link will occur to permit of further tilting movement of the platform.

13. The structure defined in claim 12, means for varying the length of said wheeled frame, and means for varying the length of said platform.

14. A body dumping vehicle comprising a frame having a forward end and a rear end, a wheel equipped rear axle supporting the rear end of said frame, a front axle underlying the forward portion of the frame, steering spindles journaled on said front axle, front wheels mounted on said steering spindles, steering arms carried by said spindles, tie rods connected to said arms, a tongue mounted on said front axle for both upward and downward swinging movement and for lateral swinging movement, said tie rods being connected to said tongue, an extensible member slidably mounted in said tongue, releasable latching means preventing forward extension of said extensible member from said tongue until released, a platform mounted on said frame for both tilting and sliding movement relative thereto, means limiting rearward sliding movement of said platform relative to said frame, an arm having its upper end pivotally connected to said platform rearwardly from the forward end thereof, said arm having its lower forward portion supported on said frame for sliding movement relative thereto, an extensible link having its upper end pivotally connected to the forward portion of said platform and having its lower end pivotally connected to said frame in rearward relation relative to the lower end of said arm, and cable means connected to said extensible member running rearwardly of the pivot of said arm and having a forwardly extending portion connected to the lower end of said arm.

15. The structure defined in claim 14 and rollers mounted at the rear end of said frame and on which said platform may ride as the forward end of the platform is raised from the frame.

16. The structure defined in claim 14 and an extensible pull cord for operating said latching means and adapted to be carried forwardly of the frame for operation from a draft vehicle.

17. The structure defined in claim 2, said extensible link comprising a telescoping rod and tube.

18. A body dumping vehicle comprising a wheeled frame having a forward end and a rear end, a wagon box receiving platform received on said frame for limited rearward sliding movement and for tilting movement relative thereto, means limiting the rearward sliding movement of said platform relative to said frame, an arm pivotally connected to said frame rearwardly from the forward end thereof and having its forward end normally projecting forward from said pivot point and mounted for sliding movement on the frame, an extensible link having its upper end pivotally connected to said platform forwardly of the pivot point of said arm and having its lower end pivotally connected to said frame rearwardly of the normal forward position of the lower end of said arm, a tongue for said wheeled frame projecting forwardly therefrom, a member slidably mounted in said tongue, means for releasably connecting said member to said tongue to prevent forward extension of said member relative to the tongue, cable means connected to said member and running rearwardly therefrom, said cable means including a portion running forwardly from a point rearwardly of the pivot point of said arm and connected to the lower end of said arm, said cable means including two cables and two winding drums, the two winding drums being mounted for rotation together, a transverse shaft carried by said frame rearwardly of the pivot point of said arm and on which said winding drums are mounted, one of the cables being connected to said member and being partially wound on one of the drums, the other cable being connected to the lower end of said arm and being wound on the other of said drums, the two drums being of different diameters and the two cables paying off their respective drums at diametrically opposite sides thereof, the drum on which the cable connected to the lower end of said arm is wound being of smaller diameter than the other drum.

JOSEPH E. ECKLUND.

REFERENCES CITED

The following references are of record in the file of this patent:

UNITED STATES PATENTS

| Number | Name | Date |
| --- | --- | --- |
| 1,330,978 | Burner et al. | Feb. 17, 1920 |
| 1,399,583 | Shadbolt | Dec. 6, 1921 |
| 2,309,787 | Quintin et al. | Feb. 2, 1943 |
| 2,436,443 | Meisenhelder | Feb. 24, 1948 |

FOREIGN PATENTS

| Number | Country | Date |
| --- | --- | --- |
| 2,886 | Great Britain | 1879 |
| 719,371 | France | 1931 |